(12) United States Patent
Johns et al.

(10) Patent No.: US 8,793,190 B2
(45) Date of Patent: *Jul. 29, 2014

(54) OFFSITE FINANCIAL ACCOUNT ONBOARDING

(71) Applicant: Serve Virtual Enterprises, Inc., St. Petersburg, FL (US)

(72) Inventors: Nicholas P. Johns, Tierre Verde, FL (US); Jason J. Hogg, St. Petersburg, FL (US); Cory Moreira, St. Petersburg, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,747

(22) Filed: Oct. 2, 2012

(65) Prior Publication Data

US 2013/0036054 A1  Feb. 7, 2013

Related U.S. Application Data

(63) Continuation of application No. 12/986,958, filed on Jan. 7, 2011, now Pat. No. 8,306,914.

(51) Int. Cl.
*G06Q 40/00* (2012.01)
(52) U.S. Cl.
USPC ............................................. 705/44; 705/39
(58) Field of Classification Search
USPC ..................................................... 705/10–44
See application file for complete search history.

(56) References Cited

U.S. PATENT DOCUMENTS

| | | | |
|---|---|---|---|
| 5,679,940 | A | 10/1997 | Templeton et al. |
| 6,354,490 | B1 | 3/2002 | Weiss et al. |
| 6,760,470 | B1 | 7/2004 | Bogosian et al. |
| 6,931,382 | B2 | 8/2005 | Laage et al. |
| 6,993,510 | B2 | 1/2006 | Guy et al. |
| 7,007,993 | B2 | 3/2006 | Kubota |
| 7,028,185 | B2 | 4/2006 | Wheeler et al. |

(Continued)

FOREIGN PATENT DOCUMENTS

KR   1020050105432   11/2005

OTHER PUBLICATIONS

PCT: International Search Report and Written Opinion dated Dec. 28, 2011 in Application No. PCT/US2011/020823.

(Continued)

*Primary Examiner* — Frantzy Poinvil
(74) *Attorney, Agent, or Firm* — Snell & Wilmer L.L.P.

(57) ABSTRACT

Offsite financial account onboarding is provided which creates a more streamlined process for a customer. The customer accesses a money services business electronic system to request financial account setup. The onboarding system establishes account access to a pooled custodial account managed by the money services business based on preliminary identification (ID) data from the customer. With only preliminary ID data, account access limits are assigned which reduces the risk of fraud or criminal activity with the customer's account access. Because account access is established with just the preliminary ID data, the customer may fully obtain account access directly from a mobile device. The money services business provides additional graduated access levels depending on additional ID data provided by the customer. Thus, depending on the type of ID data provided by the customer, the customer's account access will have corresponding access level rights to the custodial account.

20 Claims, 7 Drawing Sheets

(56) References Cited

U.S. PATENT DOCUMENTS

| | | | |
|---|---|---|---|
| 7,127,606 B2 | 10/2006 | Wheeler et al. | |
| 7,181,432 B2 | 2/2007 | Wells et al. | |
| 7,249,092 B2 | 7/2007 | Dunn et al. | |
| 7,263,506 B2 | 8/2007 | Lee et al. | |
| 7,349,871 B2 | 3/2008 | Labrou et al. | |
| 7,490,062 B2 | 2/2009 | Hansmann et al. | |
| 7,496,527 B2 | 2/2009 | Silverstein et al. | |
| 7,568,615 B2 | 8/2009 | Corona et al. | |
| 7,734,541 B2 | 6/2010 | Kumar et al. | |
| 7,752,133 B2 | 7/2010 | Rich et al. | |
| 7,827,101 B2 | 11/2010 | Mascavage | |
| 7,844,546 B2 | 11/2010 | Fleishman et al. | |
| 7,899,742 B2 | 3/2011 | Benkert et al. | |
| 7,937,325 B2 | 5/2011 | Kumar et al. | |
| 8,200,575 B2 | 6/2012 | Cordero Torres et al. | |
| 2003/0167226 A1* | 9/2003 | Britton et al. | 705/38 |
| 2003/0225692 A1* | 12/2003 | Bosch et al. | 705/42 |
| 2006/0080338 A1* | 4/2006 | Seubert et al. | 707/100 |
| 2007/0011083 A1* | 1/2007 | Bird et al. | 705/38 |
| 2007/0185821 A1* | 8/2007 | Wells et al. | 705/67 |
| 2008/0120195 A1 | 5/2008 | Shakkarwar | |
| 2008/0183515 A1* | 7/2008 | Chheda et al. | 705/7 |
| 2009/0091593 A1 | 4/2009 | Sakurai | |
| 2009/0182674 A1 | 7/2009 | Patel et al. | |
| 2010/0044430 A1* | 2/2010 | Song et al. | 235/379 |
| 2010/0145834 A1* | 6/2010 | Abbott | 705/30 |
| 2010/0299261 A1 | 11/2010 | Handler | |
| 2011/0282790 A1* | 11/2011 | Bennett et al. | 705/44 |
| 2012/0173415 A1* | 7/2012 | Egnatios et al. | 705/39 |

OTHER PUBLICATIONS

PCT; International Search Report and Written Opinion dated Dec. 27, 2011 in Application No. PCT/US2011/020819.

USPTO; Office Action dated Feb. 16, 2012 in U.S. Appl. No. 12/986,967.

USPTO; Final Office Action dated Jul. 2, 2012 in U.S. Appl. No. 12/986,967.

USPTO; Advisory Action dated Sep. 11, 2012 in U.S. Appl. No. 12/986,967.

USPTO; Office Action dated Feb. 1, 2012 in U.S. Appl. No. 12/986,958.

USPTO; Notice of Allowance dated Jul. 12, 2012 in U.S. Appl. No. 12/986,958.

Notice of Allowance dated Oct. 19, 2012 in U.S. Appl. No. 12/986,967.

International Preliminary Report on Patentability dated Oct. 22, 2012 in Application No. PCT/US2011/020819.

International Preliminary Report on Patentability dated Nov. 13, 2012 in Application No. PCT/US2011/020823.

* cited by examiner

OFFSITE FINANCIAL ACCOUNT ONBOARDING

RELATED APPLICATIONS

This application is a continuation of, claims priority to and the benefit of, U.S. Ser. No. 12/986,958 filed Jan. 7, 2011 and entitled "OFFSITE FINANCIAL ACCOUNT ONBOARDING," which is hereby incorporated in its entirety.

TECHNICAL FIELD

The present disclosure relates, in general, to offsite financial transactions and, more particularly, to offsite financial account onboarding.

BACKGROUND

In the banking industry, setting up bank accounts is one of the prerequisites to becoming accessible to the financial world. As computer technologies have advanced, more and more banking and financial transactions have begun to occur offsite from the banking institution, such as direct deposit, online banking, and the like. Online banking from a personal computer (PC) allows customers to manage bank accounts, pay bills, invest money, and the like, from anywhere the customer has access to his or her computer and a network connection. One of the last transactions that involved individuals physically entering a banking institution was for opening accounts.

The financial industry is a highly-regulated industry having both state and federal regulations for conducting various financial services. Portions of these regulations are meant to deal with fraud or criminal transactions, such as money laundering. Banking regulations require institutions to gather and verify a certain amount of identification information before opening a financial account for an individual. For example, current regulations pertaining to banks for non-federally regulated banks require the bank to obtain at least a name, date of birth, address, and an identification number, such as a social security number, a tax identification number, a passport number, or the like. Moreover, the bank must verify all of this information within a certain period of time after opening the account. While this regulated process is useful in preventing money laundering, fraud, and the like, it creates impediments to a streamlined account opening process (referred to as "onboarding") that customers would like for convenience banking, such as online or mobile banking.

With the increase in online and mobile banking, financial institutions have begun to offer offsite onboarding or online/mobile account creation. However, because of the regulatory requirements, it is still very difficult to achieve a fully online or streamline onboarding process. Some offsite onboarding features begin the onboarding process online by accepting identity information entered by the customer. Before the account is opened, however, the financial institution may send physical letters to the customer with verification data contained therein for the customer to again access the financial institution online to enter this verification data. This process may include multiple such physical letters mailed to the customer for the verification process. Therefore, while the customer is afforded the convenience of beginning the onboarding process online from a PC or mobile device, the entire process takes a number of days to complete until the account is actually opened and accessible.

BRIEF SUMMARY

The various aspects of the present disclosure are directed to offsite financial account onboarding. The disclosed process embodiments allow a more streamlined experience from the point of view of the mobile accessing customer. The customer accesses a money services business electronic system to request financial account setup. The onboarding system establishes account access to a pooled custodial account managed by the money services business based on preliminary identification (ID) data from the customer. With only preliminary ID data, account access limits are assigned which reduce the risk of fraud or criminal activity with the customer's account access. Because account access is established with just the preliminary ID data, the customer may fully obtain account access directly from a mobile device. The money services business provides additional graduated access levels depending on additional ID data provided by the customer. Thus, depending on the type and reliability of ID data provided by the customer, the customer's account access will have a corresponding level of access rights to the custodial account.

Representative embodiments of the present disclosure are directed to methods to open financial account access from an offsite location. These methods include receiving an electronic request from a customer at the offsite location to open a financial account, requesting preliminary ID information from the customer, receiving the preliminary ID information electronically from the offsite location, and, in response to the receiving, establishing immediate customer access to a pooled custodial account maintained by a money services business. The methods also include setting access limits to the pooled custodial account for the customer based on the preliminary ID information.

Further representative embodiments of the present disclosure are directed to computer program products to open financial account access from an offsite location. The computer program products include computer-readable media having program code recorded thereon. The program code includes code to receive an electronic request from a customer at the offsite location to open a financial account, code to request preliminary ID information from the customer, code to receive the preliminary ID information electronically from the offsite location, code, executable in response to the receiving, to establish immediate customer access to a pooled custodial account maintained by a money services business, and code to set access limits to the pooled custodial account for the customer based on the preliminary ID information.

Further representative embodiments of the present disclosure are directed to financial institution servers configured to open financial account access from an offsite location. These financial institution servers include at least one processor, a memory coupled to the processor, and an offsite onboarding application stored in the memory. When executed by the processor, the executing offsite onboarding application configures the financial institution servers to receive an electronic request from a customer at the offsite location to open a financial account, to request preliminary ID information from the customer, to receive the preliminary ID information electronically from the offsite location, to establish immediate customer access to a pooled custodial account maintained by a money services business in response to the receiving, and to set access limits to the pooled custodial account for the customer based on the preliminary ID information.

Further representative embodiments of the present disclosure are directed to methods to open financial account access from an offsite location. These methods include receiving ID information electronically from a customer at the offsite location, immediately establishing customer access to a pooled custodial account in response to the receiving the ID information, analyzing a reliability of the ID information concurrently with the establishing of customer access, and assigning an access restriction level associated with the customer based on the analyzed reliability of the ID information.

Further representative embodiments of the present disclosure are directed to computer program products to open financial account access from an offsite location. These computer program products include computer-readable media having program code recorded thereon. The program code includes code to receive ID information electronically from a customer at the offsite location, code to immediately establish customer access to a pooled custodial account in response to receiving the ID information, code to analyze a reliability of the ID) information concurrently with the establishment of customer access, and code to assign an access restriction level associated with the customer based on the analyzed reliability of the ID information.

Further representative embodiments of the present disclosure are directed to financial institution servers configured to open financial account access from an offsite location. These financial institution servers include at least one processor, a memory coupled to the processor, and an offsite onboarding application stored in the memory. When executed by the processor, the executing offsite onboarding application configures the financial institution server to receive ID information electronically from a customer at the offsite location, to immediately establish customer access to a pooled custodial account in response to receiving the ID information, to analyze a reliability of the ID information concurrently with the establishment of customer access, and to assign an access restriction level associated with the customer based on the analyzed reliability of the ID information.

Further representative embodiments of the present disclosure are directed to methods to open financial account access from a mobile device. These methods include transmitting a request to a money services business to open a financial account, displaying a prompt from the money services business for preliminary ID data, transmitting the preliminary ID data entered by a customer at the mobile device, receiving an acknowledgement from the money services business after transmission of the preliminary ID data that financial account access has been established with the money services business, and receiving account access limits from the money services business, wherein the account access limits correspond to the preliminary ID data.

Further representative embodiments of the present disclosure are directed to computer program products to open financial account access from an offsite location. The computer program products include computer-readable media having program code recorded thereon. The program code includes code to transmit a request to a money services business to open a financial account, code to display a prompt from the money services business for preliminary ID data, code to transmit the preliminary ID data entered by a customer at the mobile device, code to receive an acknowledgement from the money services business after transmission of the preliminary ID data that financial account access has been established with the money services business, and code to receive account access limits from the money services business, wherein the account access limits correspond to the preliminary ID data.

Further representative embodiments of the present disclosure are directed to mobile devices configured to open financial account access from an offsite location. These mobile devices include at least one processor, a memory coupled to the processor, and a banking application stored in the memory. When executed by the processor, the executing banking application configures the mobile device to transmit a request to a money services business to open a financial account, to display a prompt from the money services business for preliminary ID data, to transmit the preliminary ID data entered by a customer at the mobile device, to receive an acknowledgement from the money services business after transmission of the preliminary ID data that financial account access has been established with the money services business, and to receive account access limits from the money services business, wherein the account access limits correspond to the preliminary ID data.

The foregoing has outlined rather broadly the features and technical advantages of the present disclosure in order that the detailed description that follows may be better understood. Additional features and advantages will be described hereinafter which form the subject of the claims of this disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the present disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following description taken in conjunction with the accompanying drawings.

DETAILED DESCRIPTION

In the detailed description below, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description may be presented in terms of algorithms or symbolic representations of operations on data bits or binary digital signals stored within a computing system memory, such as a computer memory. These algorithmic descriptions or representations are examples of techniques used by those of ordinary skill in the art to convey the substance of their work to others skilled in the art.

An algorithm is here, and generally, considered to be a self-consistent sequence of operations or similar processing leading to a desired result. In this context, operations or processing involve physical manipulation of physical quantities. Typically, although not necessarily, such physical quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 1:
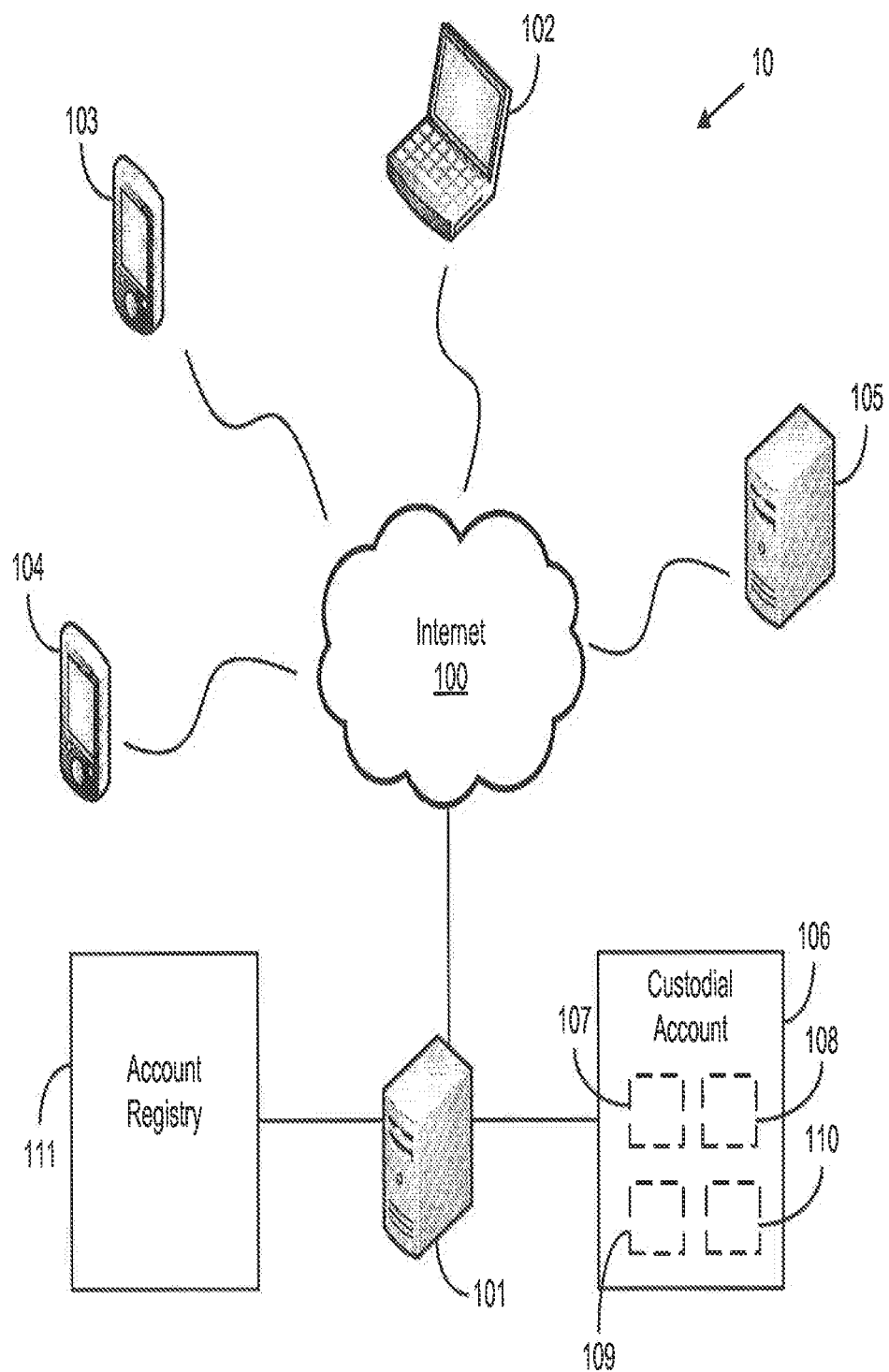
FIG. 1 a conceptual block diagram is shown illustrating an offsite financial system configured according to one embodiment of the present disclosure.

Turning now to FIG. 1, a conceptual block diagram is shown illustrating offsite financial system 10 configured according to one embodiment of the present disclosure. Transactions occurring in offsite financial system 10 are conducted via internet 100. Financial institution server 101, which may comprise a network of multiple computers and servers, manages and maintains various accounts and account information for the money services business or financial institution, as well as directing transactions involving such accounts. Customers may access financial institution server 101 via internet 100 using various mobile or personal electronic devices, such as computer 102, smartphone 103, and mobile device 104. For example, financial institution server 101 provides an online banking website (not shown) that computer 102, smartphone 103, and mobile device 104 may access using internet 100. Once access to the online banking website is achieved, customers may conduct various financial business, including, as configured according to the present disclosure, opening a financial account with the financial institution.

The money services business or financial institution offers an account available for streamlined offsite account setup or onboarding that requires minimally intrusive identification data. The financial institution server 101 also includes an offsite onboarding application (not shown) which runs when customer's request accounts from offsite locations. This application will be operated either through direct communication with the financial institution server 101 or through the banking website. A customer at computer 102 accesses the online banking website driven by financial institution server 101 and selects to open an account using the streamlined process. The web-based application requests the customer to enter preliminary identification (ID) information. Preliminary ID information includes simple ID information that provides an indication of an accurate identification of the customer, but does not rise to the level of detailed verified information required by banking regulations to establish an individual account for the customer. Such information includes the customer name, email address, mailing address, a phone number, and the like. The offsite onboarding process accepts and stores this preliminary ID information and opens account access for the customer at computer 102. In addition to the preliminary ID information the customer will provide some kind of personal identification number (PIN) that will be used to secure the customer's account access.

The offsite onboarding process opens account access for the customer, but not an actual account. Because the preliminary ID information does not rise to the level required by banking regulations to establish an individual account for the customer, the financial institution would be prohibited from opening such an individual account. However, the financial institution provides account-type services to the customer by providing the customer account access to pooled custodial account 106 maintained by the money services business or financial institution. Since the owner of this account is the financial institution, the banking regulations are met. The money services business or financial institution will, therefore, provide only monetary services to the customer through an established account access associated with that customer. Customer-associated access areas 107-110 represent conceptual sub-accounts within pooled custodial account 106 for which the financial institution tracks and manages any funds or transactions for the associated customer.

Because fraud, money laundering, terrorist activity, and the like are still concerns of the money services business or financial institution, multiple different access levels are defined for the customers based on the level of identification information provided. As such, each of customer-associated access areas 107-110 are defined at one of these several access levels according to the level of identification information that the associated customer provided. The information that allows the money services business or financial institution to differentiate between each of customer-associated access areas 107-110 and the particular access levels that each is set at is maintained in account registry 111 on financial institution server 101. In the described example, in which the customer at computer 102 provides only preliminary ID data for establishing account access, a minimum level of access is granted. For purposes of the described example, customer-associated access area 110 corresponds to the account access granted to the customer at computer 102. At the minimum level of access defined with respect to the example described in this FIG. 1, the money services business or financial institution only allows the customer to receive a limited amount of money into customer-associated access area 110, within pooled custodial account 106, every month. The financial institution does not allow the customer to send any money from the account in order to maintain a certain level of fraud safety for this minimally created access type.

If the customer at computer 102 desires to transfer money from customer-associated access area 110, the offsite onboarding process will check the restrictions associated with customer-associated access area 110 in account registry 111 and, when it is discovered that customer-associated access area 110 is not set to a high enough level to transfer money, the offsite onboarding process will prompt the customer either for additional information, which increases the reliability of customer identification, or for payment card information. A payment card is any type of representative payment indicia including credit cards, debit cards, fixed-monetary cards, such as gift cards, or the like. If the customer selects not to enter the additional information, but, instead, provides payment card information, the money transferred from customer-associated access area 110 will originate from a charge to the payment card by the financial institution. In this situation, again, no banking regulations have been triggered that forces the money services business or financial institution to obtain more verified ID data because the money transfer from customer-associated access area 110 is simply characterized as a payment card transaction. When the transaction is complete, financial institution server 101 saves the payment card information associated with the customer and customer-associated access area 110 as additional ID information that may be used to increase the reliability of the customer's identity.

In addition to online banking based on banking websites, offsite financial system 10 is also accessible using mobile applications designed for various mobile devices, such as smartphone 103 and mobile device 104. Smartphone 103 and mobile device 104 access an application repository on mobile commerce server 105 and download a mobile banking application associated with offsite financial system 10. For example, when installed on and operating on mobile device 104, the mobile banking application generates a user interface on mobile device 104 and establishes a communication link with financial institution server 101 via internet 100. The link to internet 100 may be implemented by any number of different wireless communication protocols, including long range wireless, such as the various cellular systems, or short range wireless, such as Wi-Fi Aliance's WIFI®, Bluetooth Special Interest Group's BLUETOOTH, or the like, or some combination thereof.

Once the link with financial institution server 101 is established, the customer at mobile device 104 may execute the account onboarding process by entering his or her preliminary ID information. Based on this information, financial institution server 101 creates a new customer-associated access area, for example customer-associated access area 109, and assigns the minimum access level to the new account access. This assignment data is stored in account registry 111 for maintenance and management of each of customer-associated access areas 107-110 within pooled custodial account 106. Thus, the customer at mobile device 104 is able to completely establish account access directly from mobile device 104 without first being required to setup an account via the customer's home computer (not shown) or through some combination of electronic communication and non-electronic communication.

Figure 2A:
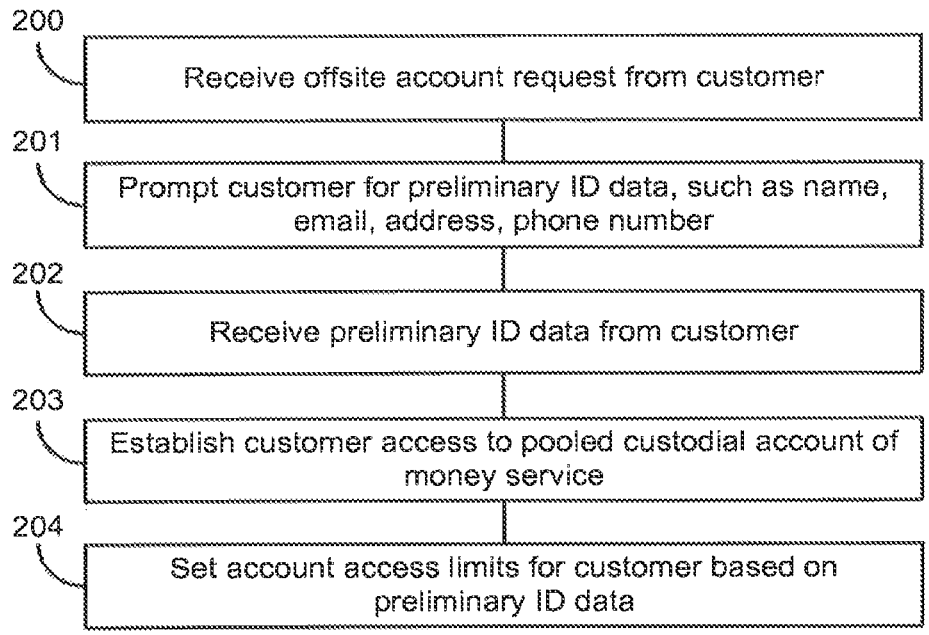
FIGS. 2A and 2B are a functional block diagrams illustrating additional example blocks executed to implement one embodiment of the present disclosure.

FIG. 2A is a functional block diagram illustrating example blocks executed to implement one embodiment of the present disclosure. In block 200, a money services business receives an account request from a potential customer. In block 201, the money services business prompts the customer for preliminary ID data, such as name, email address, mailing address, phone number, and the like. The preliminary ID data is received, in block 202, from the customer. The money services business establishes user access, in block 203, to a pooled custodial account owned by the money services business. In block 204, user access limits are set for the user access based on the preliminary ID data.

Figure 2B:
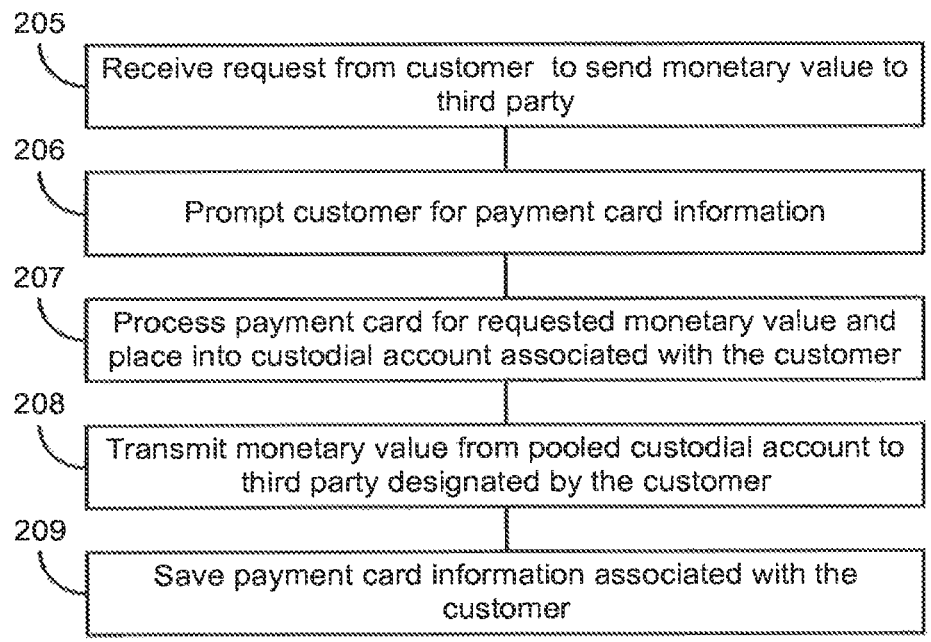

Because the preliminary ID data generally reflects a lower degree of reliability than the verified information required by the banking regulations, the account access restrictions set for accounts opened with only preliminary ID data often prohibit the customer from sending or transmitting money from the established account access. However, customers may still send or transmit money using payment cards, when the customer does not desire to submit the additional information. FIG. 2B is a functional block diagram illustrating additional example blocks executed to implement one embodiment of the present disclosure. Once account access is established using the preliminary ID data from blocks 203 and 204 (FIG. 2A), the customer may still arrange for money to be sent from the account access even though the access level is set below the level that normally allows sending money. In block 205, the money services business receives a request from the customer to send monetary value to a third part. If no additional ID data is to be given, the money services business prompts the user, in block 206, for payment card information, such as a credit or debit card, gift card, or the like. In block 207, the money services business processes the payment card for the designated monetary value and places the monetary value into the pooled custodial account. The monetary value is then transmitted, in block 208, from the pooled custodial account to the third party designated by the customer. The money services business then saves the payment card information, in block 209, which may be used for future additional ID data associated with the customer.

According to the example functionality described in FIGS. 2A and 2B, a customer was able to establish account-type services with a money services business without being required to provide the amount of verifiable ID information that regulations would normally require for establishing an individual account at a financial institution. The customer was able to both open and conduct business from the account access fully using an offsite process, whether using a PC accessing an online banking website of the financial institution or using a mobile device operating a banking application associated with the financial institution. Moreover, because of the limitations placed on the account access, the fraud and criminal risks remain relatively low.

Figure 3:
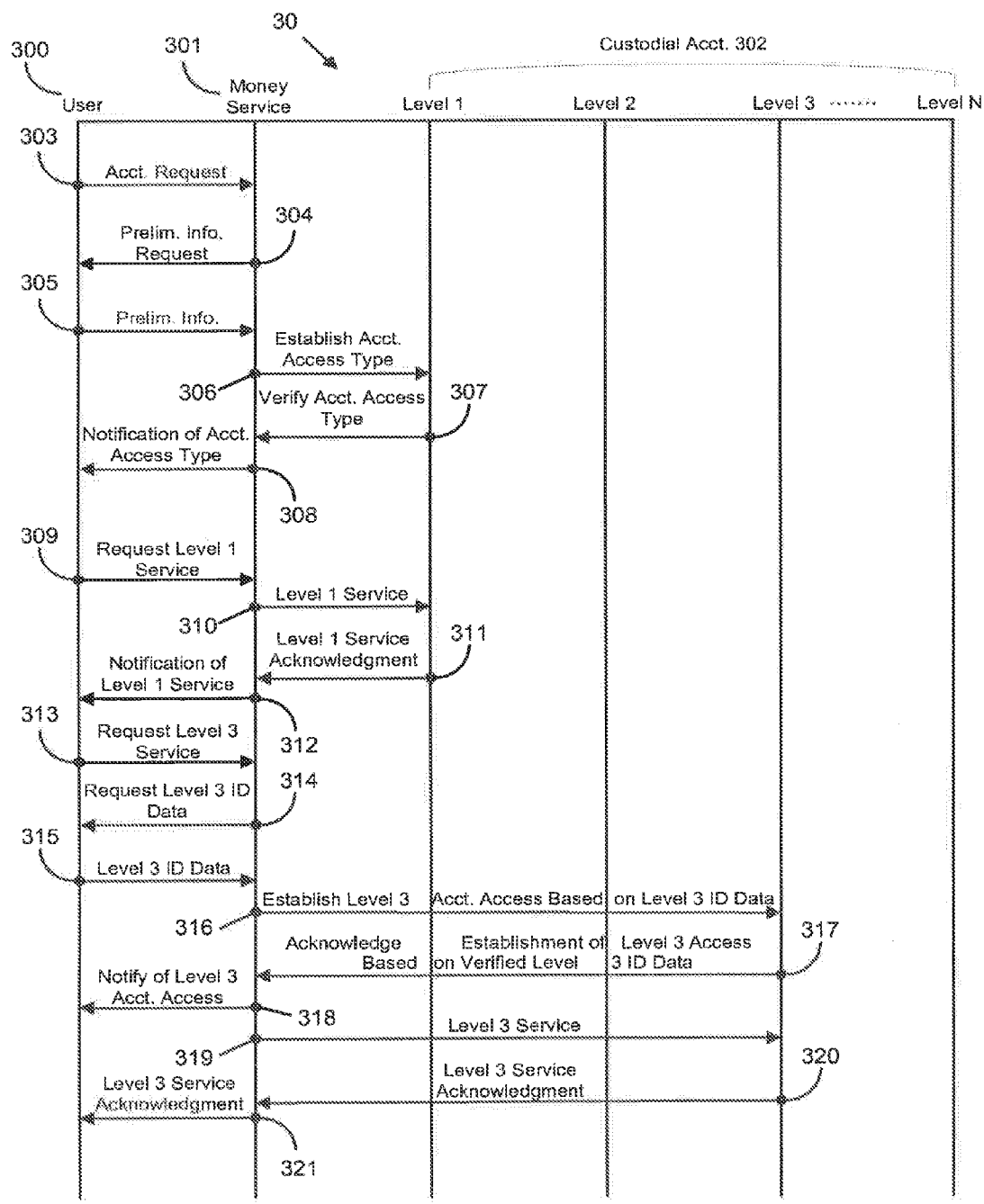
FIG. 3 is a communication flow diagram illustrating an offsite onboarding transaction conducted according to one embodiment of the present disclosure.

FIG. 3 is a communication flow diagram illustrating offsite onboarding transaction 30 conducted according to one embodiment of the present disclosure. User 300 uses a PC or mobile device to interact with money services business 301 in offsite onboarding transaction 30. Money services business 301 maintains pooled custodial account 302 which includes multiple types of account access levels for multiple users, including user 300. The specific type or level of account access granted to a user is tied to the level of ID information provided by the user to money services business 301. At 303, user 300 transmits an account request to money services business 301. In response, money services business 301 requests user 300 to provide preliminary ID information at 304. User 300, at 305, submits his or her preliminary ID information to money services business 301. Based on this preliminary ID information, money services business 301, at 306, immediately establishes account access for user 300 at a Level 1. The new Level 1 account is acknowledged at 307, after which, at 308, money services business 301 notifies user 300 of the account access set up.

At 309, user 300 submits a Level 1 service request to money services business 301. Money services business 301 initiates and completes the requested Level 1 service at 310 and 311, and acknowledges the completion of the Level 1 service to user 300 at 312. At 313, user 300 submits a Level 3 service request to money services business 301. A Level 3 service may include sending a higher amount of monetary value to a third party or receiving a higher monetary value into custodial account 302 associated with user 300. The higher monetary values increase the risk of fraud or criminal activity. Money services business 301 recognizes the Level 3 request and, after checking the service level associated with the account access of user 300, at 314, requests user 300 to submit additional Level 3 ID information. Level 3 ID information may include more verifiable or reliable ID information such as a social security number, bank account, a linked credit/ debit card, linked bank account, or the like, or any combination thereof. This additional ID information allows money services business 301 to more reliably verify the identity of user 300. A Level 3 service may trigger the data requirements of banking regulations, which would also require money services business 301 to collect and verify the additional ID data. At 315, user 300 submits Level 3 ID data to money services business 301, which, when validated or verified, prompts money services business 301 to, at 316 and 317, increase the account access of user 300 to a Level 3. At 318, money services business 301 notifies user 300 that his or her account access has been granted to Level 3. Money services business 301 initiates and completes the Level 3 service, at 319 and 320, and then notifies user 300 of the completion of the Level 3 service at 321.

According to the additional functionality as described with respect to FIG. 3, user 300 is first allowed to establish account access to pooled custodial account 302 through a less onerous preliminary ID information. This information can be entered directly by user 300 through PC access to an online banking website or directly into a banking application operating on a mobile device. Only when user 300 requests a higher level of service is the additional ID information requested. The overall level of access allowed to pooled custodial account 302 is graduated based on the level of ID information supplied by user 300. The more reliable the ID information, the higher level of access money services business 301 provides.

Figure 4:
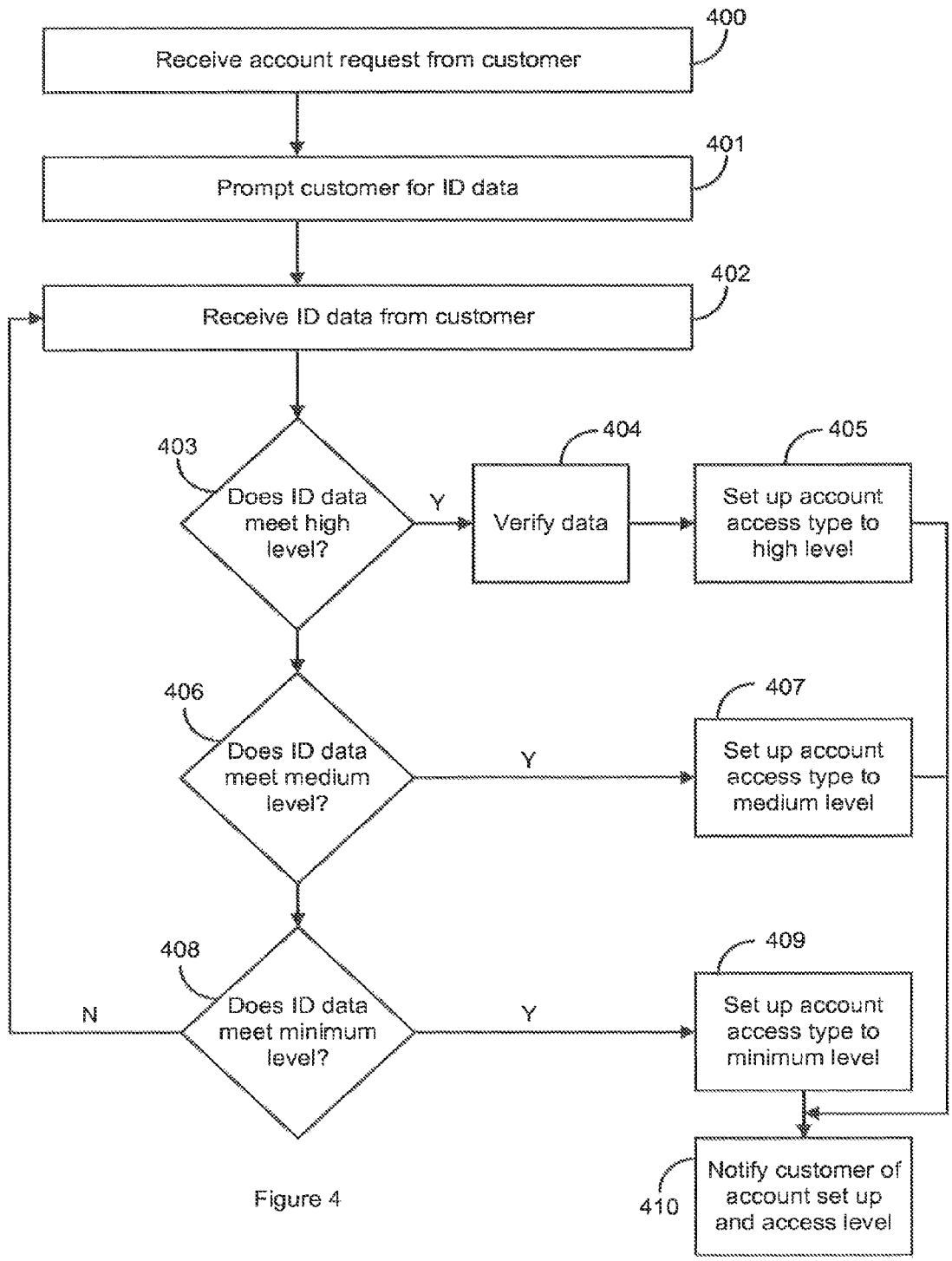
FIG. 4 is a functional block diagram illustrating example blocks executed to implement one embodiment of the present disclosure.

FIG. 4 is a functional block diagram illustrating example blocks executed to implement one embodiment of the present disclosure. In block 400, a money services business receives a request from a customer to open account-type services. The money services business requests the customer, in block 401, for ID data. ID data is received, in block 402, from the customer. A determination is made, in block 403, whether the ID data received from the customer is sufficient to qualify for high level account access to a pooled custodial account of the money services business. If so, then, in block 404, the data is verified, and account access is set up to the high level, in block 405. If the ID data is not sufficient to qualify for high level account access, then, in block 406, another determination is made whether the ID data is sufficient to qualify for medium level account access to the custodial account. If so, then, in block 407, account access is set up to the medium level. If the ID data is not sufficient to qualify for the medium level account access, then, in block 408, a determination is made whether the ID data is sufficient to qualify for the minimum level of access to the custodial account. If not, then, the process repeats with the customer being requested for additional ID data at block 401. If, however, the data is sufficient to qualify for the minimum level access, then, in block 409, account access is set up to the minimum level. After account access is set up in any of blocks 405, 407, or 409, then, in block 410, the customer is notified of the account access setup and corresponding access level.

Figure 5:
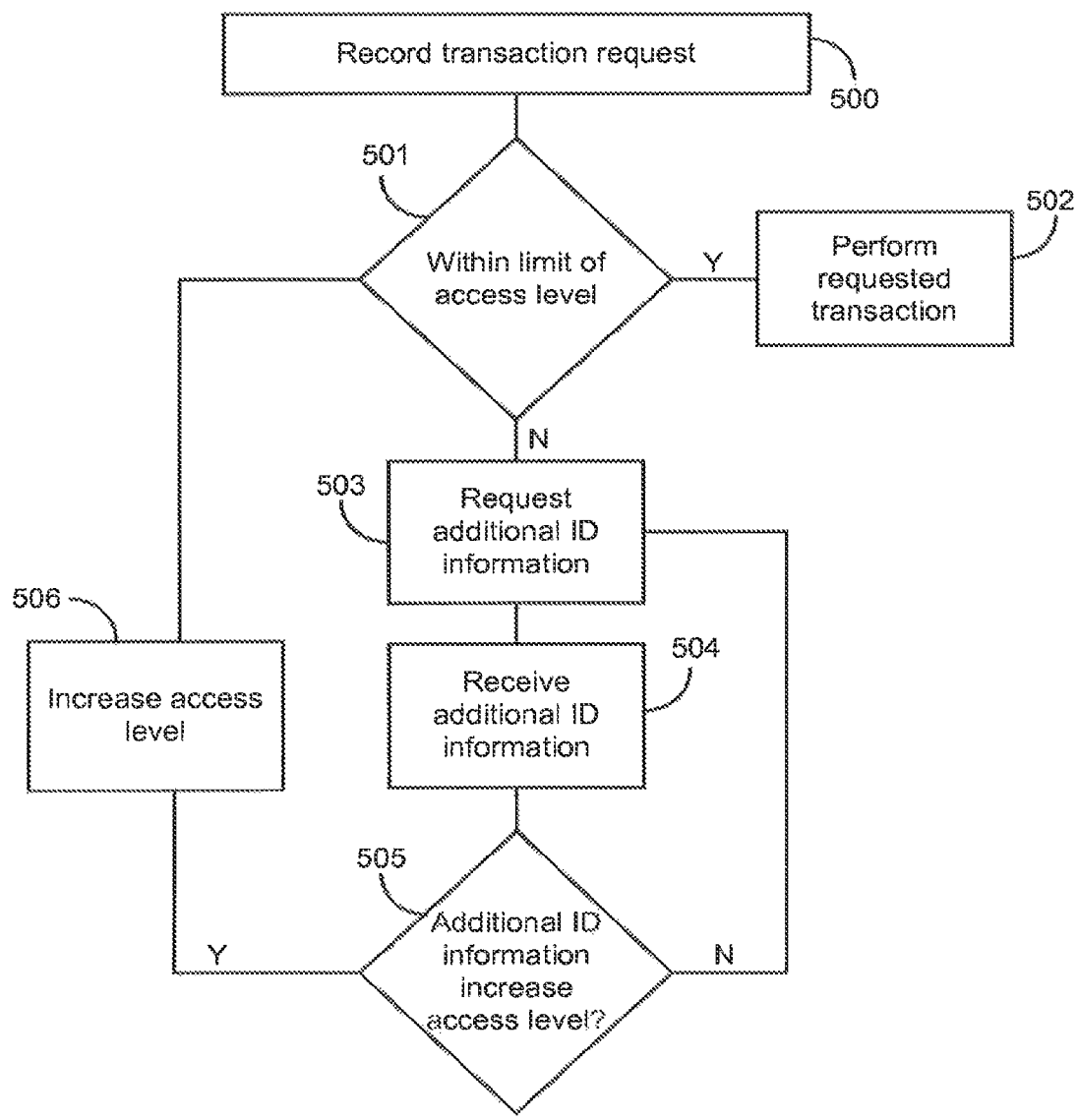
FIG. 5 is a functional block diagram illustrating example blocks executed to implement one embodiment of the present disclosure.

Once account access has been set up, service requests from a customer are analyzed by the money services business owning and managing account access to the pooled custodial account according to the particular access level associated with the customer. FIG. 5 is a functional block diagram illustrating example blocks executed to implement one embodiment of the present disclosure. In block 500, a transaction request is received from a customer with account access to a custodial account of a money services business. A determination is made, in block 501, whether the requested transaction falls within the limitations associated with the access level of the customer. If so, then, in block 502, the money services business performs the requested transaction. If not, then, in block 503, additional ID data is requested from the customer. The money services business receives additional ID data from the customer, in block 504, and, in block 505, a determination is made whether the received additional ID data is sufficient to increase the access level of the customer. If not, then, the process repeats with still more additional ID data requested from the customer in block 503. If so, then, in block 506, the access level of the customer is increased according to the additional ID data. The analysis process then repeats from block 501 with a determination of whether the requested transaction falls within the limitations associated with the new access level. This transaction request process will repeat until either the customer provides sufficient additional ID data to support an access level capable of performing the requested transaction or the customer withdraws the transaction request or the money services business denies the request.

Figure 6:
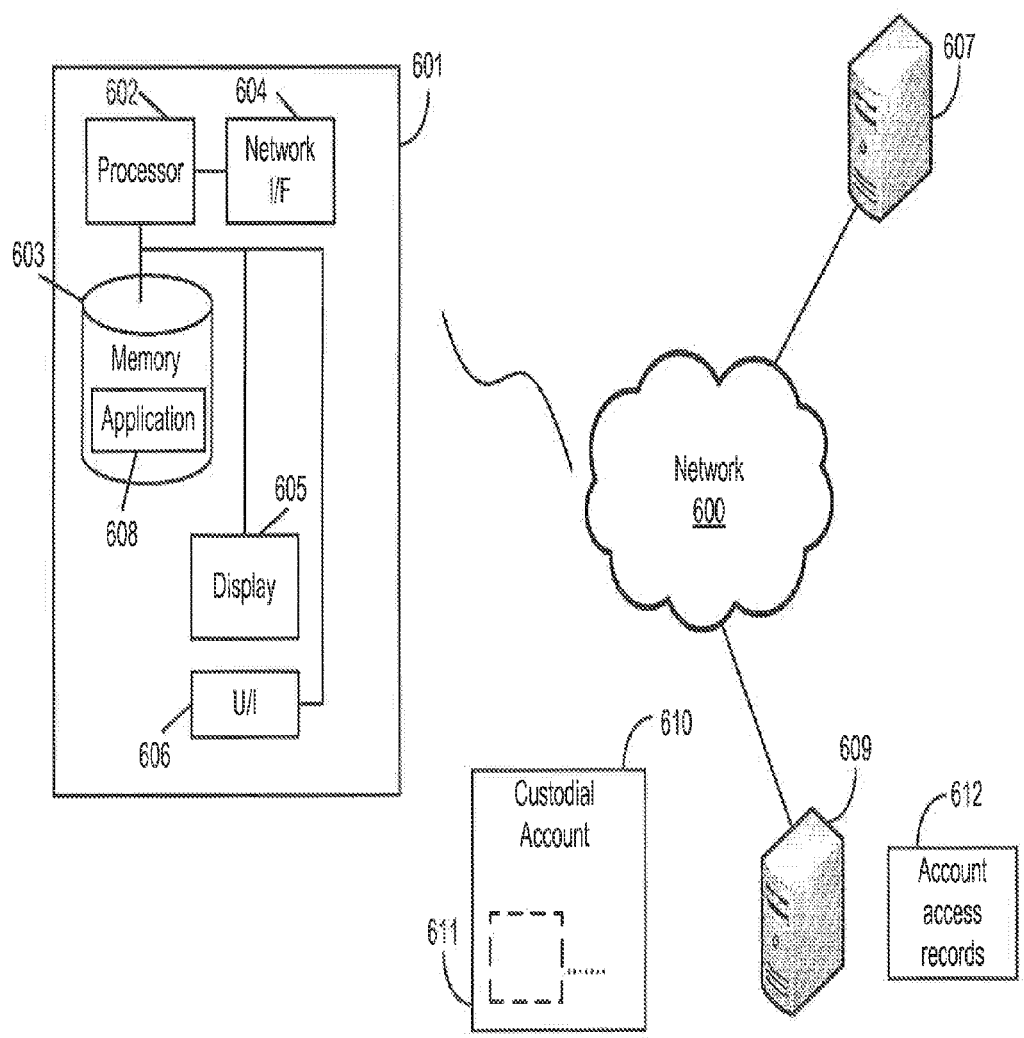
FIG. 6 is a conceptual block diagram illustrating a mobile device configured for providing offsite account onboarding according to one embodiment of the present disclosure.

FIG. 6 is a conceptual block diagram illustrating mobile device 601 configured for providing offsite account onboarding according to one embodiment of the present disclosure. Mobile device 601 may be any number of different mobile devices, such as smartphones, mobile phones, personal data assistants (PDAs), interactive media players, and the like. Mobile device 601 includes processor 602 which drives the functionality of the device. Processor 602 executes applications and code stored in memory 603 and controls the functionalities through network interface 604, display 605, user interface feature 606, and the like. In order to access offsite account onboarding, the user of mobile device 601 accesses an application store provided on electronic commerce server 607 via network 600 and downloads banking application 608 to memory 603.

When executed by processor 602, banking application 608 provides a graphical user interface on display 605 with user input/out functionality from user interface feature 606. Banking application 608 also establishes a communication link with financial institution server 609 via internet 600. A user of mobile device 601 can establish account access to custodial account 610 on financial institution server 609 simply by interacting with the onboarding feature of banking application 608. The user provides preliminary ID information to financial institution server 609. Based on this preliminary ID information, financial institution server 609 establishes customer account access area 611 within custodial account 610. Financial institution server 609 also assigns an access level to customer account access area 611 that is commensurate with the preliminary ID information. With preliminary ID information, the access level assigned will be very low, but the user will still have an established account access without providing the amount of information normally required by banking regulations for establishing an individual account. Financial institution server 609 then records the association between the user, customer account access area 611, and the access level assigned in account access records 612. When receiving transaction requests from the user of mobile device 601 or any other user, it will access account access records 612 to determine whether the requested transaction request falls within the limitations associated with the assigned access level.

Embodiments, or portions thereof, may be embodied in program or code segments operable upon a processor-based system (e.g., computer system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, cell phone data/voice networks, and/or the like.

Figure 7:
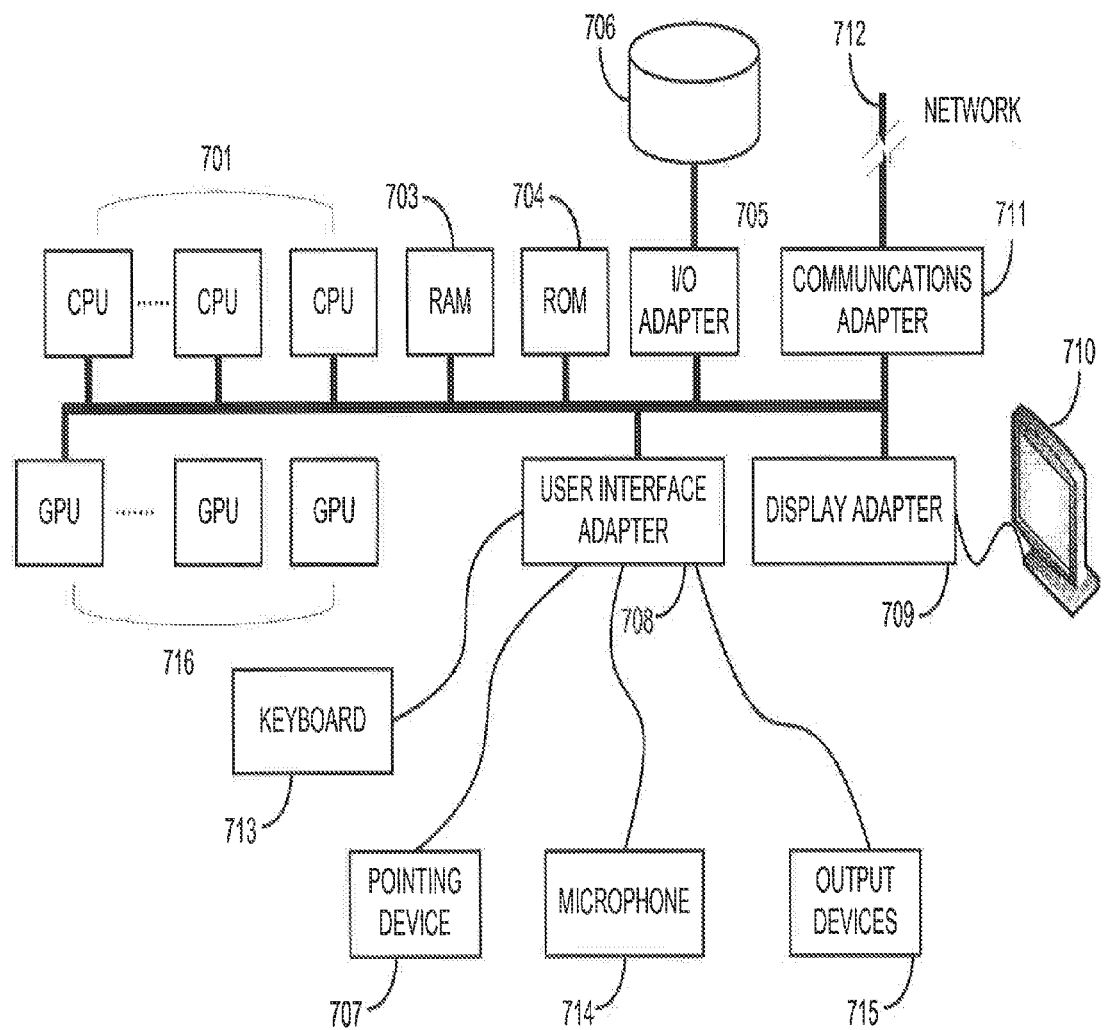
FIG. 7 illustrates exemplary computer system which may be employed to implement the various aspects and embodiments of the present disclosure.

FIG. 7 illustrates exemplary computer system 700 which may be employed to implement the various aspects and embodiments of the present disclosure. Central processing unit ("CPU" or "processor") 701 is coupled to system bus 702. CPU 701 may be any general-purpose processor. The present disclosure is not restricted by the architecture of CPU 701 (or other components of exemplary system 700) as long as CPU 701 (and other components of system 700) supports the inventive operations as described herein. As such CPU 701 may provide processing to system 700 through one or more processors or processor cores. CPU 701 may execute the various logical instructions described herein. For example, CPU 701 may execute machine-level instructions according to the exemplary operational flow described above in conjunction with FIGS. 2A-5 and any of the other processes described with respect to illustrated embodiments. When executing instructions representative of the operational steps illustrated in FIGS. 2A-5 and any of the other processes described with respect to illustrated embodiments, CPU 701 becomes a special-purpose processor of a special purpose computing platform configured specifically to operate according to the various embodiments of the teachings described herein.

Computer system 700 also includes random access memory (RAM) 703, which may be SRAM, DRAM, SDRAM, or the like. Computer system 700 includes read-only memory (ROM) 704 which may be PROM, EPROM, EEPROM, or the like. RAM 703 and ROM 704 hold user and system data and programs, as is well known in the art.

Computer system 700 also includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information.

I/O adapter 705 connects to storage device(s) 706, such as one or more of hard drive, compact disc (CD) drive, floppy disk drive, tape drive, etc., to computer system 700. The storage devices are utilized in addition to RAM 703 for the memory requirements of the various embodiments of the present disclosure. Communications adapter 711 is adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 and/or by graphical processing unit (GPU) 716 to control the display on display device 710 to, for example, present the results of the simulation. GPU 716 may be any various number of processors dedicated to graphics processing and, as illustrated, may be made up of one or more individual graphical processors. GPU 716 processes the graphical instructions and transmits those instructions to display adapter 709. Display adapter 709 further transmits those instructions for transforming or manipulating the state of the various numbers of pixels used by display device 710 to visually present the desired information to a user. Such instructions include instructions for changing state from on to off, setting a particular color, intensity, duration, or the like. Each such instruction makes up the rendering instructions that control how and what is displayed on display device 710.

It shall be appreciated that the present disclosure is not limited to the architecture of system 700. For example, any suitable processor-based device or multiple such devices may be utilized for implementing the various embodiments of the present disclosure, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method comprising:
analyzing, by a financial transaction computer, preliminary identification (ID) information to determine an access level for a customer to a pooled custodial account;
creating, by the computer, a customer access area for the customer in the pooled custodial account; and
associating, by the computer, the customer access area with access limits, wherein the access limits are associated with the access level to the pooled custodial account, and wherein the preliminary ID information is used to determine the access level for the customer.

2. The method of claim 1, further comprising, in response to a monetary transfer request exceeding the access limits, requesting payment information from the customer.

3. The method of claim 2, further comprising receiving the payment information from the customer.

4. The method of claim 3, further comprising processing the payment information for an amount of the monetary transfer request.

5. The method of claim 4, further comprising transferring the amount to the third party.

6. The method of claim 1, further comprising:
receiving, from the customer, a financial service request;
determining whether the financial service request falls within the access limits;
in response to the financial service request exceeding the access limits, requesting additional ID information from the customer,
receiving the additional ID information from the customer;
determining whether the additional ID information supports an increased access level to the pooled custodial account;
in response to the additional ID information supporting the increased access level, associating the customer access area with the increased access level; and
in response to the financial service request falling within increased access limits associated with the increased access level, performing the financial service request from the pooled custodial account.

7. The method of claim 1, further comprising receiving, by the computer, an electronic request from a customer at an offsite location to open a financial account.

8. The method of claim 1, further comprising requesting, by the computer, preliminary identification (ID) information from the customer.

9. The method of claim 1, further comprising analyzing, by the computer, the preliminary ID information to determine an access level for the customer to the pooled custodial account.

10. The method of claim 1, further comprising analyzing, by the computer, a reliability of the preliminary ID information.

11. The method of claim 1, further comprising determining the access level based upon a reliability of the preliminary ID information.

12. The method of claim 1, wherein the pooled custodial account is maintained by a money services business.

13. An article of manufacture including a non-transitory, tangible computer readable storage medium having instructions stored thereon that, in response to execution by a financial transaction computer-based system, cause the computer-based system to be capable of performing operations comprising:
analyzing, by the computer-based system, preliminary ID information to determine an access level for a customer to a pooled custodial account;
creating, by the computer-based system, a customer access area for the customer in the pooled custodial account; and
associating, by the computer-based system, the customer access area with access limits, wherein the access limits are associated with the access level to the pooled custodial account, and wherein the preliminary ID information is used to determine the access level for the customer.

14. A system comprising:
a financial transaction processor,
a tangible, non-transitory memory configured to communicate with the processor,
the tangible, non-transitory memory having instructions stored thereon that, in response to execution by the processor, cause the processor to be capable of performing operations comprising:
analyzing, by the processor, preliminary ID information to determine an access level for a customer to a pooled custodial account;
creating, by the processor, a customer access area for the customer in the pooled custodial account; and
associating, by the processor, the customer access area with access limits, wherein the access limits are associated with the access level to the pooled custodial account, and wherein the preliminary ID information is used to determine the access level for the customer.

15. The system of claim 14, further comprising, in response to a monetary transfer request exceeding the access limits, requesting payment information from the customer.

16. The system of claim 14, further comprising:
receiving, from the customer, a financial service request;
determining whether the financial service request falls within the access limits;
in response to the financial service request exceeding the access limits, requesting additional ID information from the customer;
receiving the additional ID information from the customer,
determining whether the additional ID information supports an increased access level to the pooled custodial account;
in response to the additional ID information supporting the increased access level, associating the customer access area with the increased access level; and
in response to the financial service request falling within increased access limits associated with the increased access level, performing the financial service request from the pooled custodial account.

17. The system of claim 14, further comprising receiving, by the processor, an electronic request from a customer at an offsite location to open a financial account.

18. The system of claim 14, further comprising requesting, by the processor, preliminary identification (ID) information from the customer.

19. The system of claim 14, further comprising analyzing, by the processor, the preliminary ID information to determine an access level for the customer to the pooled custodial account.

20. The system of claim 14, further comprising determining the access level based upon a reliability of the preliminary ID information.

* * * * *